United States Patent
Kraning et al.

(10) Patent No.: US 12,225,040 B2
(45) Date of Patent: Feb. 11, 2025

(54) REMOTE ATTACK SURFACE DISCOVERY AND MANAGEMENT

(71) Applicant: Palo Alto Networks, Inc., Santa Clara, CA (US)

(72) Inventors: Matthew Stephen Kraning, San Francisco, CA (US); Corey James Fredericks, San Leandro, CA (US); Andrew Clayton Scott, Westfield, IN (US); Peter Thomas Dickinson, Vallejo, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 226 days.

(21) Appl. No.: 17/813,952

(22) Filed: Jul. 21, 2022

(65) Prior Publication Data

US 2023/0121331 A1 Apr. 20, 2023

Related U.S. Application Data

(60) Provisional application No. 63/262,608, filed on Oct. 15, 2021.

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC ................ H04L 63/1433; H04L 63/20; H04L 63/108; H04L 63/107
See application file for complete search history.

(56) References Cited

U.S. PATENT DOCUMENTS 7,680,100 B1 * 3/2010 Corliss ................ H04L 12/4633
379/88.17
9,288,190 B1 3/2016 Brinskelle
(Continued)

OTHER PUBLICATIONS

Anbazhagan, "Help Prevent Critical Exposures for Employeeson Unsecure Remote Networks Using the ASMfor Remote Workers Module", [online] retrieved on Dec. 10, 2021 from <https://www.paloaltonetworks.com/blog/security-operations/attack-surface-management-for-remote-workers/>, Oct. 29, 2021.
(Continued)

*Primary Examiner* — Vu V Tran
(74) *Attorney, Agent, or Firm* — Gilliam IP PLLC

(57) ABSTRACT

Techniques for identifying and managing an organization's remote attack surface that account for the fluid nature of the remote attack surface are described. Data collected from organization-issued endpoint devices are obtained and analyzed to determine public IP addresses used by the endpoint devices. The devices connected to external networks (i.e., non-organization networks) at various time windows are identified by distinguishing between public IP addresses that are associated with the organization and those that are not. Data obtained from ongoing global probing of public IP addresses, which at least indicate software instances hosted on networks corresponding to the public IP address, are correlated with each public IP address determined to be associated with an external network to which an endpoint device has connected. From these data, any security risks that connections to external networks may pose to the organization's network can be identified.

20 Claims, 6 Drawing Sheets

(56) References Cited

U.S. PATENT DOCUMENTS

| | | | | |
|---|---|---|---|---|
| 2018/0337941 | A1* | 11/2018 | Kraning | H04L 63/0227 |
| 2019/0020674 | A1* | 1/2019 | Vervier | H04L 63/1408 |
| 2020/0007559 | A1* | 1/2020 | Morgan | G06F 16/951 |
| 2022/0086182 | A1* | 3/2022 | Maggioli | H04L 63/1433 |
| 2022/0159029 | A1* | 5/2022 | Bendersky | H04L 63/18 |

OTHER PUBLICATIONS

Anbazhagan, "Know When Your Remote Employee Networks Are Vulnerable", [online] retrieved on Jul. 17, 2022 from <https://www.paloaltonetworks.com/blog/security-operations/secure-remote-worker-networks/>, Jun. 13, 2022.
EP Application No. 22201392.2, Extended European Search Report mailed Mar. 14, 2023, 9 pages.

* cited by examiner

REMOTE ATTACK SURFACE DISCOVERY AND MANAGEMENT

BACKGROUND

The disclosure generally relates to transmission of digital information and to network architectures or network communication protocols for network security.

A number of technologies and techniques are available to provide increased network security for the increasing number of organizations shifting toward a remote or hybrid work model. A common solution is through the utilization of a virtual private network ("VPN") for use by remotely-located employees who access resources and/or services of their employer. Remote access VPNs in particular provide for creation of tunnels between remotely located clients and the organization's network to provide employees with secure access to resources/services of the organization, even when the employee connected to the VPN on a public network.

BRIEF DESCRIPTION OF THE DRAWINGS

Aspects of the disclosure may be better understood by referencing the accompanying drawings.

DESCRIPTION

Figure 1:
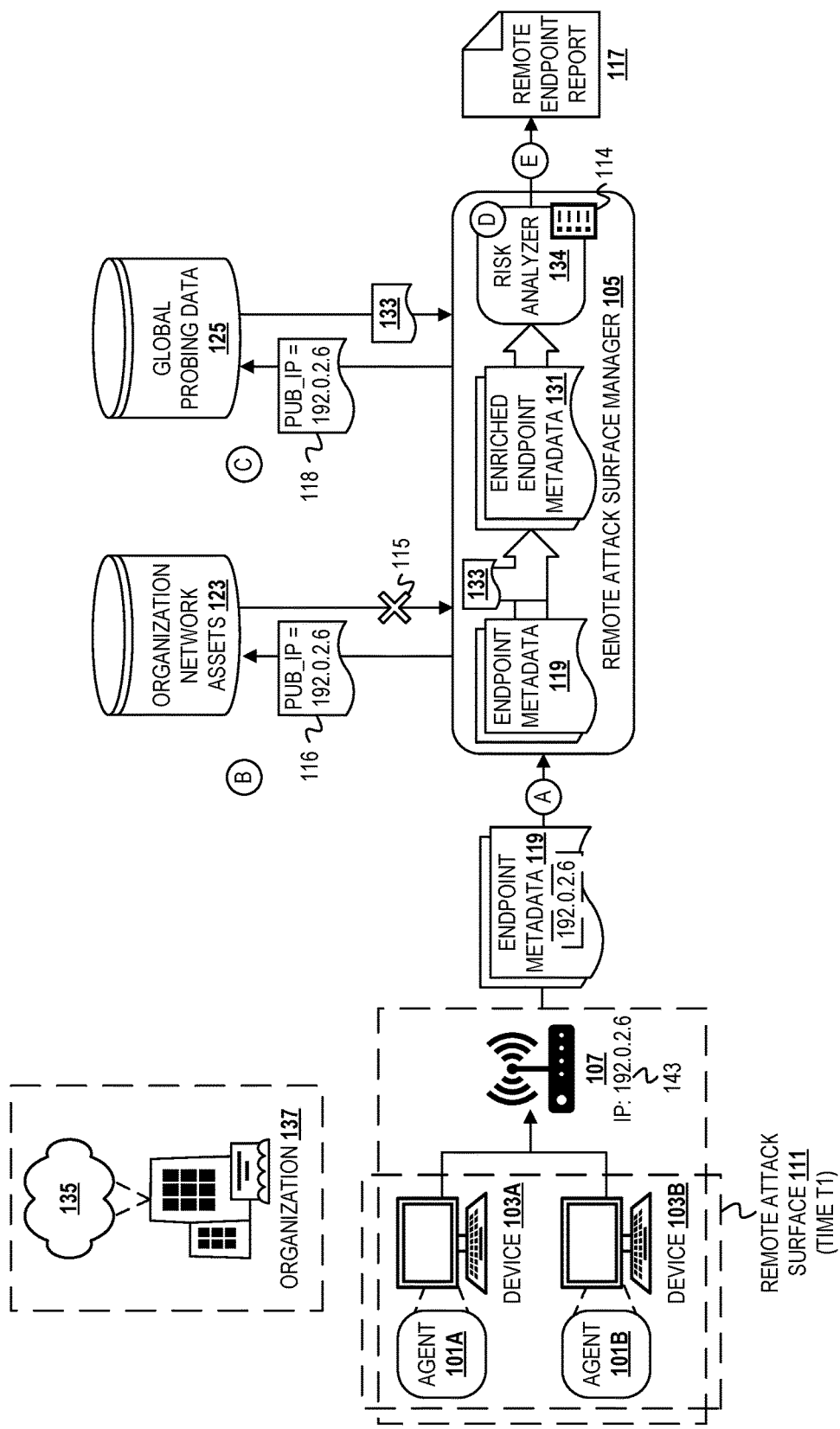
FIG. 1 is a conceptual diagram of identifying a remote attack surface of an organization.

The description that follows includes example systems, methods, techniques, and program flows that embody aspects of the disclosure. However, it is understood that this disclosure may be practiced without these specific details. For instance, this disclosure refers to determining public Internet Protocol ("IP") addresses that have been assigned to routers to which remote endpoint devices have connected in illustrative examples. Aspects of this disclosure can be also applied to other network devices that connect to the Internet and have been assigned a public IP address. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud," this description is referring to the resources of a cloud service provider ("CSP"). For instance, a cloud can encompass the servers, virtual machines, and storage devices of a CSP. In more general terms, a CSP resource accessible to customers is a resource owned/manage by the CSP entity that is accessible via network connections. Often, the access is in accordance with an application programming interface or software development kit provided by the CSP.

A "network connection" refers to a wired or wireless connection of an endpoint device to a network, such as a connection to a local area network ("LAN")/wide area network ("WAN") or the Internet. A network connection is referred to as being established once the endpoint device can transmit and receive data over the connection. A public IP address assigned to a network device that is used for a network connection from an endpoint device to the Internet is said to be used by or associated with the endpoint device.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

The increasing shift toward hybrid and remote work models has introduced additional complexities to managing the attack surface of an organization's network. Some knowledge of entry points into the network can be retained by extending the organization's network to remote employees through a VPN to which employees are to connect via company-owned or company-managed devices. However, some aspects are outside of the organization's scope of management. Remote employees may be working behind network devices with any number of public IP addresses that are unknown to the organization and are used to provide connections to networks that are not managed by the organization, such as Wi-Fi networks in employees' homes. Further, the attack surface of the organization's network among remote employees can be fluid. In other words, the set of external networks (i.e., networks not provided or managed by the organization) to which remote employees are connected is not fixed and can change at any time even when a VPN is utilized. For instance, remote employees may connect to different networks while traveling or may connect to public Wi-Fi networks when working outside of the home (e.g., in cafes, libraries, etc.).

Described herein are techniques for identifying an organization's attack surface across its remote employees and determining the associated security risks to which the organization's network is exposed that account for the fluid nature of the remote attack surface. A remote attack surface manager periodically obtains data about endpoint devices issued by the organization that at least comprise public IP addresses used by the endpoint devices, such as from agents installed on the endpoint devices or network traffic logs or authentication logs of remote employee activity, and identifies those that correspond to connections to external (i.e., non-organization) networks. Endpoint devices that are connected to external networks are thus remote from the organization. The remote attack surface manager can identify the remote endpoint devices by distinguishing between public IP addresses that are known to be associated with the organization from those that are not. Examples of public IP addresses that are not associated with the organization are those assigned to network devices in employees' homes, businesses that offer public Wi-Fi, or similar locations.

After determining the public IP addresses corresponding to external networks to which endpoint devices have connected, the remote attack surface manager correlates the public IP addresses with data obtained from ongoing global probing of public IP addresses. This data can include geolocation data, a known owner/provider of the public IP address, and identities of software instances that are accessible via the public IP address. From these data, the remote attack surface manager can identify security risks to which the organization's network is exposed as a result of a remote endpoint device connecting to an external network known to be associated with security risks. For instance, a remote endpoint device may be connecting to an external network on which software with a known vulnerability is also hosted that, if attacked, give an attacker a "presence" on the external network and thus access to the organization's network via the remote endpoint device. Endpoint metadata collection and correlation with global probing data to identify security issues is ongoing so that changes in the remote attack surface and the associated connections to external networks can be identified. Security measures taken to address security issues identified for external network connections can therefore be targeted accordingly.

Example Illustrations

FIG. 1 is a conceptual diagram of identifying a remote attack surface of an organization. A remote attack surface manager (hereinafter the "RAS manager") 105 identifies and manages a remote attack surface of an organization 137 having remote employees. The RAS manager 105 may execute in the cloud (e.g., as a cloud-based service). Remote employees are those who have organization-issued endpoint devices and connect to networks external to the organization's network 135 from those endpoint devices. The network 135 may encompass a network established at one location of the organization 137 or may encompass a network established at a headquarters location and a private network(s) established at a branch office(s) of the organization 137 (e.g., a WAN or a software-defined WAN ("SD-WAN"). The organization 137 may provide a VPN for access to the network 135 by remote employees.

Endpoint devices issued by the organization 137 for both remote and onsite employees may have agents installed thereon from which the RAS manager 105 can obtain data. This example depicts a device 103A on which an agent 101A executes and a device 103B on which an agent 101B executes. The devices 103A-B are connected to a router 107 that is a gateway router with a public IP address 143 of 192.0.2.6. The devices 103A-B are issued by the organization 137 but are remote from the organization 137; in other words, the router 107 is not owned or managed by the organization 137 and is part of a network environment that is external to the network 135. Deployed agents including the agents 101A-B collect endpoint device metadata from their respective devices, where the endpoint device metadata at least comprises a public IP address(es) associated with the corresponding endpoint device and identifying information of the endpoint device, such as a private IP address and/or device identifier.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the RAS manager 105 obtains endpoint metadata 119 collected by the agents 101A-B for the corresponding devices 103A-B. The RAS manager 105 periodically obtains endpoint device metadata collected by agents installed on organization-issued endpoint devices during time windows of a configurable length (e.g., 24 hours), which includes the agents 101A-B. The agents 101A-B can determine and record various information about their respective devices 103A-B, which at least includes device identifiers and/or private IP addresses and public IP addresses. As the devices 103A-B establish various network connections, the agents 101A-B determine and record the public IP address used to establish each network connection. The agents 101A-B may begin metadata collection for the respective endpoint device after the endpoint device has booted and established a network connection. Periodic collection of endpoint metadata from the agents 101A-B may be triggered by expiration of a time window or may be scheduled based on the time window, such as scheduled to occur daily at midnight. When collection of endpoint data is triggered, the RAS manager 105 may poll the agents 101A-B for data collected during the time window, or the agents 101A-B may report endpoint data collected during the time window to the RAS manager 105. Triggering of endpoint data collection may thus be configured for the agents 101A-B and/or for the RAS manager 105. The endpoint metadata 119 that the RAS manager 105 obtains upon triggering of endpoint data retrieval include the data about the devices 103A-B collected by the agents 101A-B during a first time window. The endpoint metadata 119 at least comprise the public IP address 143 used by the devices 103A-B and metadata that identify the devices 103A-B (e.g., device identifiers). FIG. 1 depicts the RAS manager 105 as obtaining endpoint metadata from the agents 101A-B corresponding to the devices 103A-B for clarity and to aid in understanding. In implementations, the RAS manager 105 can obtain metadata of a plurality of organization-issued endpoint devices having corresponding agents executing thereon, where the endpoint devices may be remote endpoint devices or may be onsite (i.e., in an office of the organization 137).

At stage B, the RAS manager 105 determines which of the obtained endpoint metadata 119, if any, correspond to endpoint devices that are connected to external networks. An external network is any network to which an endpoint device has established a connection using a public IP address that is not associated with the organization 137. For instance, an external network may be a private network in the home of an employee to which an endpoint device can connect and access the Internet. Public IP addresses that are not associated with the organization 137 include those that are not registered with or owned by the organization 137 or are otherwise unknown to the organization 137, such as by being associated with network devices that are not part of the network environment of the network 135.

The RAS manager 105 determines whether the devices 103A-B have established network connections with external networks based on the endpoint metadata 119. To do so, the RAS manager 105 identifies the public IP address indicated in the endpoint metadata 119 for each of the devices 103A-B (e.g., based on a corresponding data field) and determines whether the public IP address is associated with an asset of the organization 137 having a corresponding entry in a repository 123 of network assets of the organization 137. Entries of the repository 123 indicate public IP addresses that are associated with the organization 137, including those associated with network assets that are part of the network environment that creates and maintains the network 135. The RAS manager 105 submits a query 116 to the repository 123 that indicates the public IP address 143 that it identified from the endpoint metadata 119. A result 115 of the query 116 indicates that the public IP address 143 does not match any that are associated with the organization 137. The RAS manager 105 determines that the public IP address 143 associated with the devices 103A-B is not associated with the organization 137 and identifies the devices 103A-B as remote endpoint devices that are connected to an external network. The devices 103A-B therefore form a remote attack surface 111 of the network 135 during the first time window for which the endpoint metadata 119 were collected.

While not depicted in FIG. 1, in implementations, the RAS manager 105 may maintain a cache of public IP address determined to correspond to external networks. The RAS manager 105 may cache the public IP address 143 upon determining that the public IP address 143 cannot be identified in the repository 123 and thus is not associated with the organization. A public IP address may be maintained in the cache until the RAS manager 105 has not performed a lookup in the cache for the public IP address for a designated number of time windows. To illustrate, if a public IP address is cached and the RAS manager 105 does not read the cache for the public IP address for five time windows, the public IP address may be removed from the cache. Caching of public IP addresses determined to be external to the organization 137 based on results of queries submitted to the repository 123 facilitates rapid lookups for public IP addresses that are used for establishing network connections that do not change frequently, such as public IP addresses of the home gateway router of an employee that consistently works at home.

At stage C, the RAS manager 105 correlates the endpoint metadata 119 determined to correspond to remote endpoint devices with other data obtained for the public IP address 143 from global probing of public IP addresses. The RAS manager 105 or a system/platform with which it cooperates performs ongoing probing of public IP addresses. The probing of public IP addresses is referred to as global probing since the targeted set of public IP addresses includes any publicly routable IP version 4 (IPv4) address and/or IP version 6 (IPv6) address and thus is not limited to the public IP addresses that are local to (i.e., associated with) the organization. To probe public IP addresses, the probing service communicates requests according to a plurality of communication protocols to each of the target set of public IP addresses on a plurality of ports, where the requests comprise payloads that elicit a response from a recipient of each request. Each request is for the instance(s) of software hosted behind the public IP address (also referred to herein as the "service" hosted behind the public IP address), the source(e) (e.g., vendor) of the software, and/or the version(s) of the software, where responses to the requests comprise this information for each public IP address. The probing service can further correlate this information with other publicly available information that may be available for services accessible over a network connection. For instance, the probing service can correlate the information determined for each public IP address with data about software vulnerabilities that are available from the Common Vulnerabilities and Exposures ("CVE") database and/or the National Vulnerability Database ("NVD"), geolocation data associated with public IP addresses (e.g., country, city, region, and/or latitude/longitude), data indicating providers of public IP addresses (e.g., CSPs and Internet Service Providers ("ISPs")), etc. This information about each public IP address that results from global public IP address probing is stored in association with the corresponding public IP address in a repository 125 to which the RAS manager 105 has access. Public IP address probing and updating the repository 125 with information determined from responses is performed periodically (e.g., daily) to ensure that the maintained information reflects what services are currently accessible via each public IP address.

Correlating the endpoint metadata 119 with information obtained from global IP address probing includes determining which of the data stored in the repository 125 correspond to a public IP address used by the devices 103A-B and may further include associating the determined data with the endpoint metadata 119 (e.g., by aggregating the data/metadata). The RAS manager 105 submits a query 118 indicating the public IP address 143 to the repository 125. A response 133 to the query indicates the information about the public IP address used by the devices 103A-B for connecting to an external network. The RAS manager 105 associates these data about the public IP address 143 that are extracted (e.g., copied) from the response 133 with the endpoint metadata 119 to result in enriched endpoint metadata 131. The enriched endpoint metadata 131 thus comprise indications of the devices 103A-B that are connected to an external network, the public IP address 143 used for the network connection, and the information about the public IP address 143 obtained from global probing.

At stage D, the RAS manager 105 determines whether the network connection established by the devices 103A-B via the public IP address 143 exposes the network 135 to security risks and is thus a security issue for the organization 137. The RAS manager 105 comprises a risk analyzer 134. The risk analyzer 134 analyzes the enriched endpoint metadata 131 to determine whether the subset of the enriched endpoint metadata 131 that correspond to the public IP address 143 (i.e., the subset corresponding to the information obtained from the response 133) are indicative of security risks associated the public IP address 143. Security risks that may be associated with a public IP address include certain services hosted on a network to which a connection can be established via the public IP address or the public IP address corresponding to an unusual or suspicious location (e.g., Russia), for example. Services that are associated with security risks include those that are vulnerable, out of date, or are commonly used as attack vectors, such as remote desktop protocol ("RDP") server software. These security risks that can be identified from results of global probing can be defined in security policies of the organization 137 for external networks used by its remote employees, depicted as security policies 114 in this example. As an example, the security policies 114 may indicate that external networks on which an RDP server is hosted expose the network 135 to security risks and should be identified as a security issue by the risk analyzer 134. The security policies 114 can be implemented as rules that indicate security risks and one or more criteria for corresponding global probing data that are indicative of each security risk. The risk analyzer 134 analyzes the enriched endpoint metadata 131 based on the security policies 114 to determine whether the public IP address 143 corresponds to an external network that exposes the network 135 to security risks.

In implementations, the system/platform that performs the periodic probing of public IP addresses may also evaluate responses to determine security risks associated with each public IP address based on the security policies 114 or other heuristics. In such cases, an indication of security risk associated with each public IP address will also be stored in association with the public IP address in the repository 125 so that the results of the risk assessment are available to the RAS manager 105. The response 133 and enriched endpoint metadata 131 generated therefrom will indicate the security risk known for the public IP address 143, such as whether a service(s) that is exposed to the Internet via the public IP address 143 is known to be vulnerable or otherwise associated with a security risk. If risks have already been determined for each public IP address having an entry in the repository 125, the risk analyzer 134 evaluates the enriched endpoint metadata 131 to identify the indications of security risk. As an example, the response 133 may have indicated that a web server with a known vulnerability is accessible via the public IP address 143. The risk analyzer 134 identifies this indication of a security risk based on analysis of the enriched endpoint metadata 131 and determines that the public IP address 143 is associated with a security risk.

At stage E, the RAS manager 105 generates and indicates a report 117 based on evaluation of the enriched endpoint metadata 131 by the risk analyzer 134. The report 117 may indicate the remote attack surface 111 identified for the first time window (e.g., with identifiers of the devices 103A-B) and the public IP addresses 143 determined to be used by the devices that form the remote attack surface 111. The report 117 also indicates any security risks specified in the security policies 114 that the risk analyzer 134 identified for the public IP address 143. The RAS manager 105 can indicate the report 117 by presenting the report 117 (e.g., for display on a graphical user interface ("GUI")), storing the report 117 in a repository of reports, and/or otherwise making the report 117 available for viewing or analysis. The report 117 thus indicates whether the network connection established by the devices 103A-B to an external network via the public IP address 143 is a security issue for the organization 137 due to exposing the network 135 to security risks, which allows for targeted remediation or corrective action.

Figure 2:
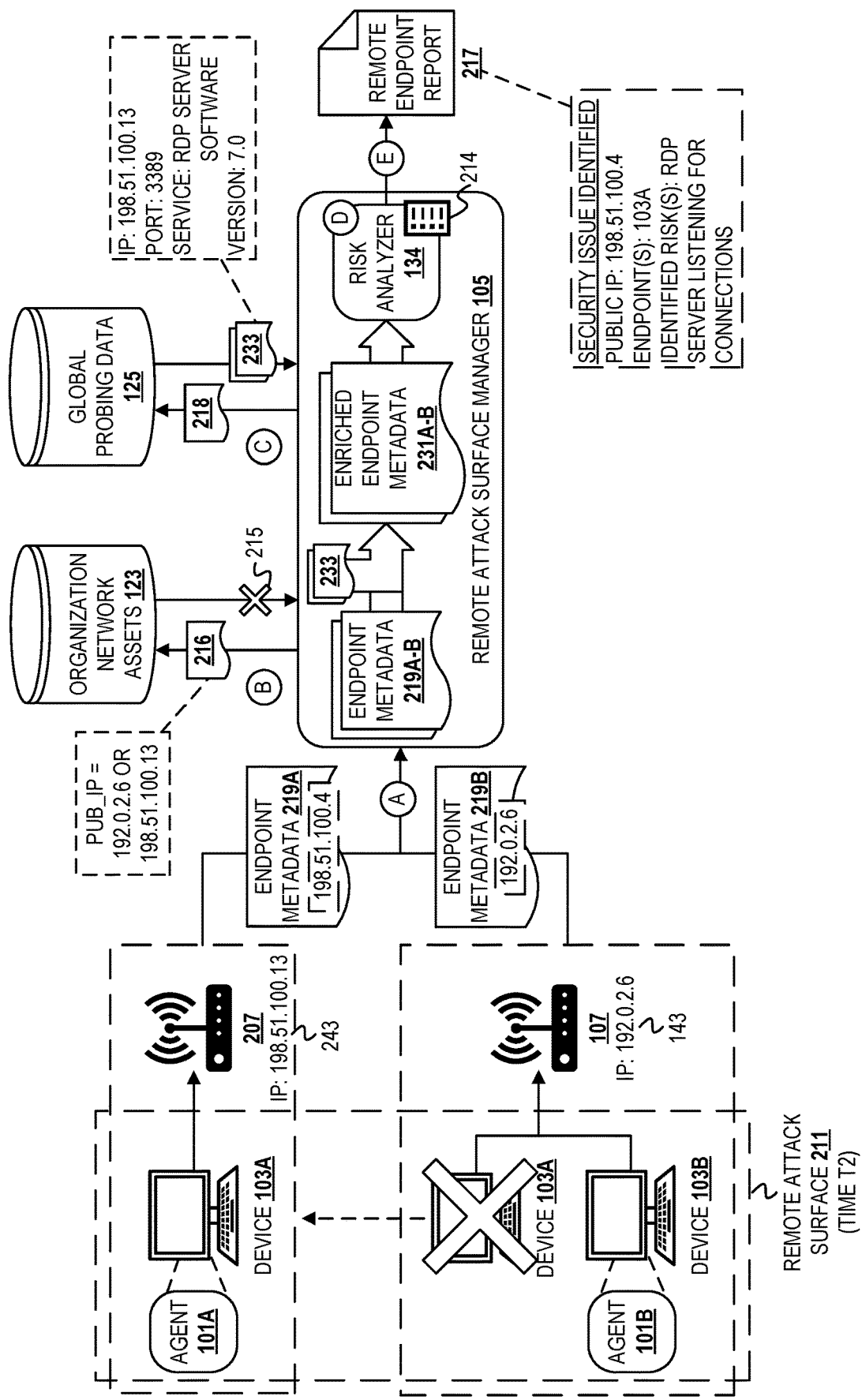
FIG. 2 is a conceptual diagram of identifying a remote attack surface of an organization as remote endpoint devices move between external networks.

FIG. 2 is a conceptual diagram of identifying a remote attack surface of an organization as remote endpoint devices move between external networks. FIG. 2 depicts the device 103B as connected to the router 107 and thus with an unchanging network connection via the public IP address 143. In this example, however, the device 103A is now connected to a router 207 with a public IP address 243 of 198.51.100.13. Movement of remote endpoint devices between external networks, or changes in network connections between remote endpoint devices and networks external to the network 135, can occur at any time since remote employees can connect to any number of networks outside of the office. For instance, remote employees may be traveling and connect to the employer's VPN while away from their home Wi-Fi network. As another example, remote employees may connect to a public Wi-Fi network in a public setting (e.g., a cafe or library) from an organization-issued endpoint device. FIG. 2 refers to the organization 137 and its network 135 depicted and described in reference to FIG. 1.

FIG. 2 is also annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the RAS manager 105 obtains endpoint metadata 219A collected by the agent 101A for the device 103A and endpoint metadata 219B collected by the agent 101B from the device 103B. At the end of a second time window after that described in reference to FIG. 1 (e.g., upon expiration of the next 24 hour period), the RAS manager 105 obtains metadata of endpoint devices issued by the organization 137 for which activity was logged during the second time window. While this example depicts the RAS manager 105 as again obtaining endpoint metadata for the devices 103A-B, the set of endpoint devices from which the RAS manager 105 obtains metadata for a subsequent time window(s) from the first time window is not necessarily the same set of endpoint devices as those from which endpoint metadata were obtained for the first time window since activity of endpoint devices may change between time windows. The endpoint metadata 219A comprise the public IP address 243, and the endpoint metadata 219B collected from the device 103B comprise the public IP address 143.

At stage B, the RAS manager 105 determines whether the public IP addresses indicated in either of the endpoint metadata 219A-B correspond to external network connections. The RAS manager 105 identifies the public IP address 143 and public IP address 243 from the respective ones of the endpoint metadata 219A-B and queries the repository 123 for the public IP addresses 143, 243 to determine whether the public IP address 143 and/or the public IP address 243 are associated with the organization 137 or correspond to external networks. The RAS manager 105 submits at least a first query 216 to the repository 123 that indicates the public IP addresses 143, 243 and obtains a result 215 indicating that neither of the public IP addresses 143, 243 are maintained in the repository. As described in reference to FIG. 1, the RAS manager 105 may maintain a cache for rapid lookups of public IP addresses determined to correspond to external networks. The RAS manager can thus first read from the cache to determine whether either of the public IP addresses 143, 243 correspond to external networks. The public IP address 143 may have been cached during the first time window as described in reference to FIG. 1 since the network connection established by the device 103A has remained unchanged, so the RAS manager 105 determines that the public IP address 143 is not associated with the organization based on reading from the cache. Since the public IP address 243 has not been cached, the RAS manager 105 queries the repository 123 for the public IP address 243 through submission of the query 216 and determines from the result 215 that the public IP address 243 is external to the organization.

The RAS manager 105 determines that the public IP addresses associated with the devices 103A-B are associated with external networks based on reading from the cache and/or querying the repository 123. The devices 103A-B therefore form a remote attack surface 211 of the network 135 during the second time window for which the endpoint metadata 219A-B were collected. As illustrated by this example, the RAS manager 105 can identify the remote attack surface of the network 135 regardless of changes in external network connections between or within time windows.

At stage C, the RAS manager 105 correlates the endpoint metadata 219A-B determined to correspond to remote endpoint devices with other data obtained for the public IP addresses 143, 243 from global probing of public IP addresses. The RAS manager 105 again queries the repository 125 to retrieve this data, which may have been updated since the previous time window based on results of periodic probing of public IP addresses; in other words, different information may be associated with the public IP address 143 in the repository 125 than that associated therewith during the first time window. The RAS manager 105 submits a query(ies) 218 indicating the public IP addresses 143, 243 to the repository 125 and obtains a response(s) 233 that indicates the information about the public IP addresses 143, 243. The response(s) 233 indicates that a host using the public IP address 243 is running RDP server software of version 7.0 and is listening on port 3389.

The RAS manager 105 associates the data about the public IP address 243 extracted from the response(s) 233 with the endpoint metadata 219A and the data about the public IP address 143 extracted from the response(s) 233 with the endpoint metadata 219B, which yields enriched endpoint metadata 231A and enriched endpoint metadata 231B, respectively. The enriched endpoint metadata 231A indicate the device 103A (e.g., with a device identifier or private IP address), the public IP address 243 used for the external network connection, and information about the public IP address 243 obtained from global probing. Similarly, the enriched endpoint metadata 231B therefore indicate the device 103B, the public IP address 143 used for the external network connection, and information about the public IP address 143 obtained from global probing.

At stage D, the RAS manager 105 determines whether the network connections established by the devices 103A-B with the corresponding public IP addresses 143, 243 expose the network 135 to security risks and thus are security issues for the organization 137. The risk analyzer 134 of the RAS manager 105 analyzes each of the enriched endpoint metadata 231A-B based on the security policies 114 to determine whether either external network connection indicated therein is a security issue. Returning to the example given in reference to FIG. 1, the security policies 114 may comprise a first policy that connections to external networks on which an RDP server is hosted should be identified as a security issue for the network 135. If the probing service already performed a risk assessment and inserted results of the risk assessment with the corresponding ones of the public IP addresses 143, 143 into the repository 125 as also described in reference to FIG. 1, the risk analyzer 134 determines whether any security risks are indicated in the enriched endpoint metadata 231A and/or enriched endpoint metadata 231B based on the analysis.

At stage E, the RAS manager 105 generates and indicates a report 217 based on evaluation of the enriched endpoint metadata 231A-B by the risk analyzer 134. The RAS manager 105 can indicate the report 217 by presenting the report 217 (e.g., for display on a GUI), storing the report 217 in a repository of reports, and/or otherwise making the report 217 available for viewing or analysis. The report 217 may indicate the remote attack surface 211 identified for the second time window and the public IP addresses 143, 243 determined to be used by the devices 103A-B that form the remote attack surface 211. The report 217 also indicates any security risks specified in the security policies 214 that the risk analyzer 134 identified for the public IP address 143 and/or the public IP address 243. In this example, the report 217 indicates that the connection of the device 103A to an external network with the public IP address 243 is a security issue for the network 135 since an RDP server is also hosted on the external network. Any remediation or corrective action can thus be targeted to the device 103A due to its connection to an external network exposing the organization's network to security risks.

FIGS. 1 and 2 depict examples in which public IP addresses are determined based on endpoint metadata collected by agents installed on endpoint devices issued by an organization at stage A. In implementations, public IP addresses may also or instead be determined from VPN logs and/or endpoint logs generated by endpoint devices. For instance, referring to FIGS. 1 and 2, the RAS manager 105 may obtain endpoint logs generated by the devices 103A-B when retrieval of endpoint data is triggered. As another example, if the provider of the VPN used by the organization 137 for extending the network 135 to remote employees comprises logging services that log public IP addresses, the RAS manager 105 may obtain VPN logs from log storage of the VPN provider corresponding to the devices 103A-B when retrieval of endpoint data is triggered. In either of these examples, the RAS manager 105 determines the public IP address used by each endpoint device based on analyzing corresponding ones of the endpoint logs and/or VPN logs. Correlation of public IP addresses determined from endpoint logs and/or VPN logs and determination of security risks to which the organization's network is exposed as a result of external network connections with the public IP addresses can then be performed as similarly described in reference to stages B-E of FIGS. 1 and 2.

While not depicted in FIG. 1 or 2, after identifying a public IP address corresponding to an external network that is associated with a security risk(s) indicated by the security policies 114, the RAS manager 105 may add the public IP address to a list of public IP addresses indicative of external networks that do not comply with the security policies 114. The list of IP addresses associated with noncompliant external networks can be communicated to agents deployed to endpoint devices that have been issued by the organization 137, such as the agents 101A-B executing on the devices 103A-B depicted in this example. To minimize exposure of the organization's network to security risks, upon subsequent attempts by endpoint devices to establish connections to any of the noncompliant external networks, the agents may block the network connection attempt or may enforce a restricted set of permissions for the communication session with an endpoint on the external network. As an example, with reference to FIG. 2, the RAS manager 105 can communicate to the agents 101A-B that the public IP address 243 is associated with an external network that did not comply with the security policies 114. Upon receipt of the communication from the RAS manager 105, the agents 101A-B update a locally maintained list of public IP addresses associated with noncompliant external networks with the public IP address 243. If either of the agents 101A-B subsequently detect that the corresponding one of the devices 103A-B is attempting to connect to an external network with the public IP address 243, the agents 101A-B can prohibit establishment of the network connection. In other examples, the agents may permit establishment of the network connection but prohibit communication with any other devices connected to the external network. Whether the agents 101A-B block or limit connections to external networks with public IP addresses determined to be associated with security risks may be dictated by policies installed on the agents 101A-B.

Figure 3:
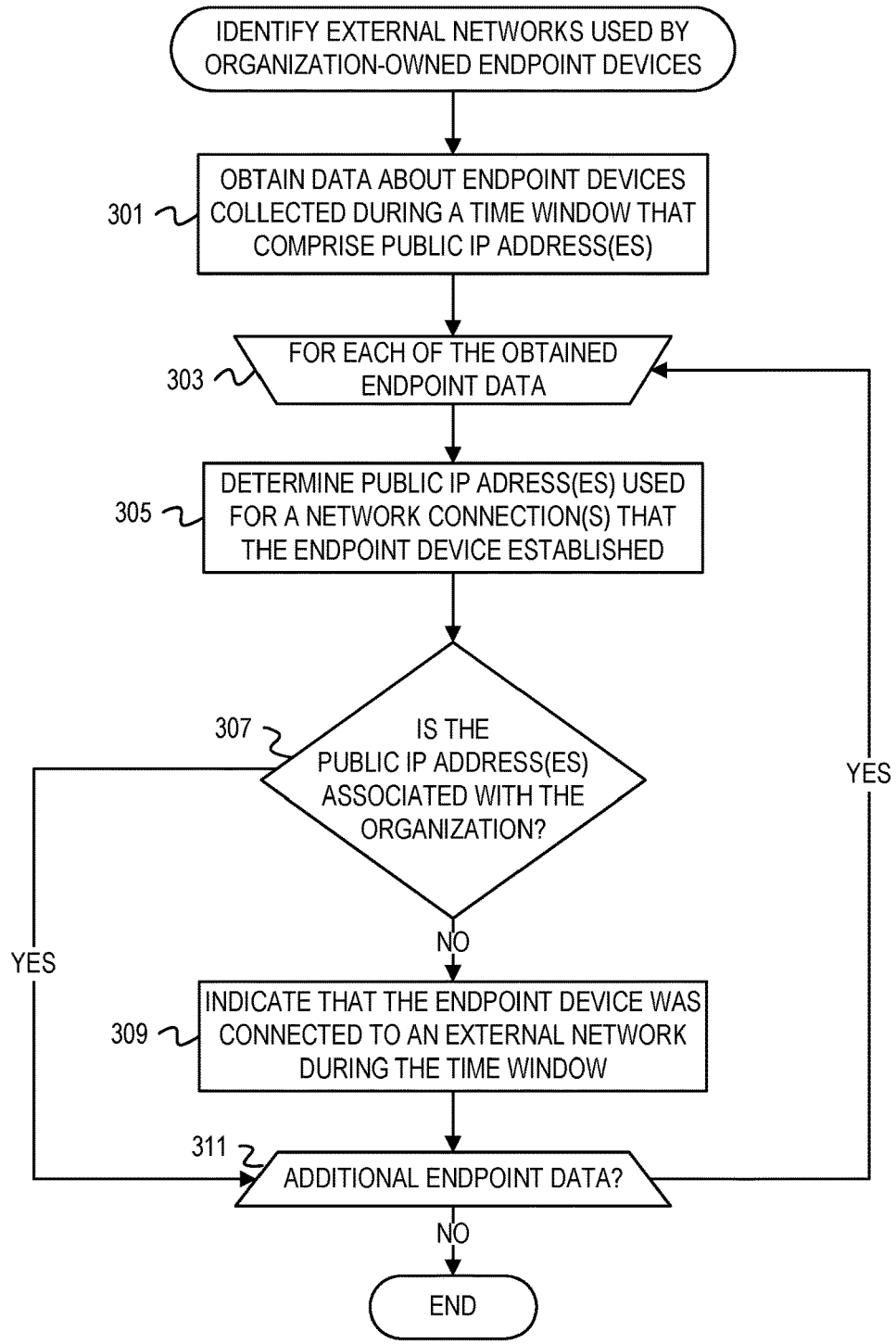
FIG. 3 is a flowchart of example operations for identifying external networks used by organization-owned endpoint devices.
Figure 4:
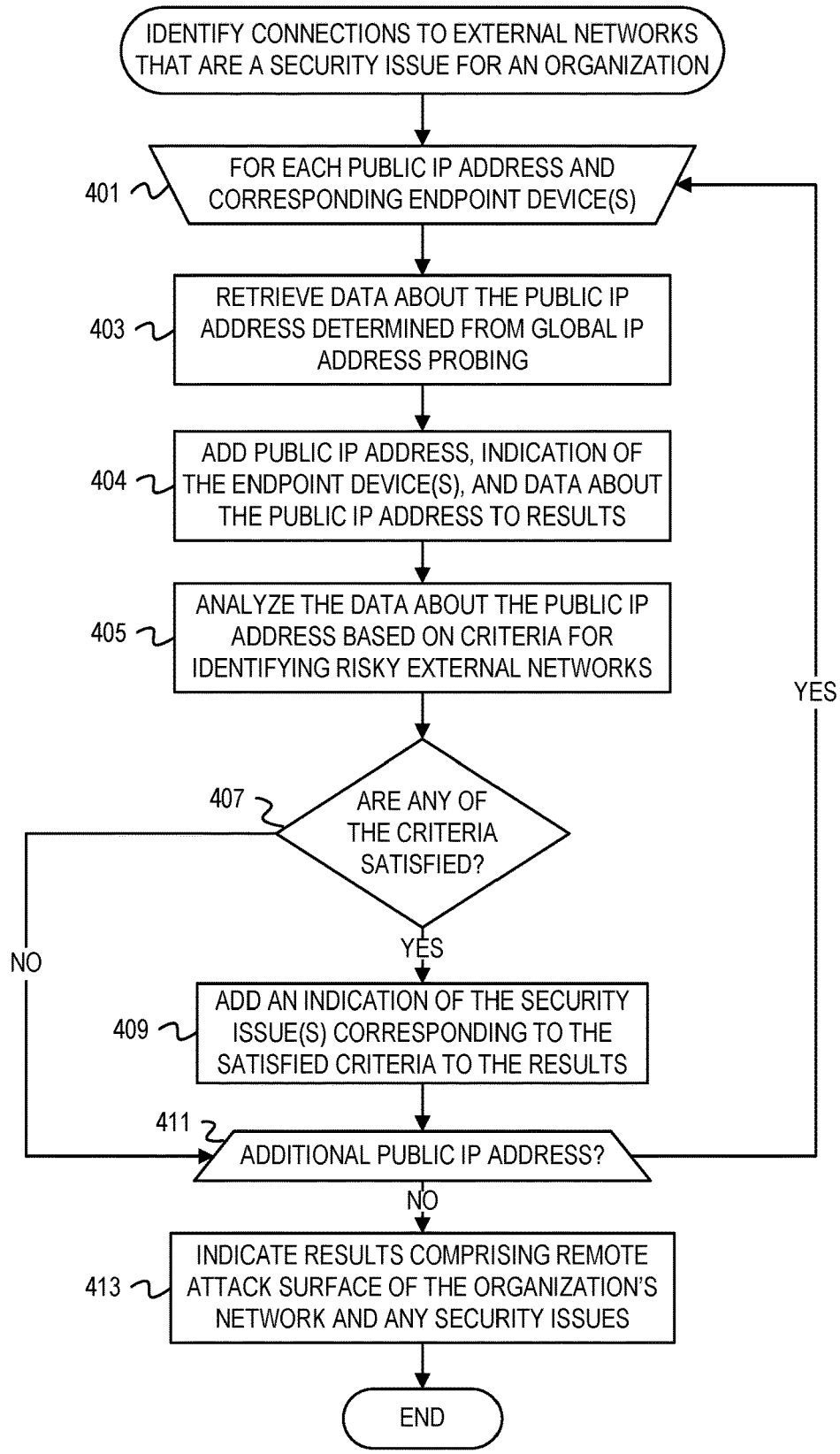
FIG. 4 is a flowchart of example operations for identifying connections to external networks that are a security issue for an organization.
Figure 5:
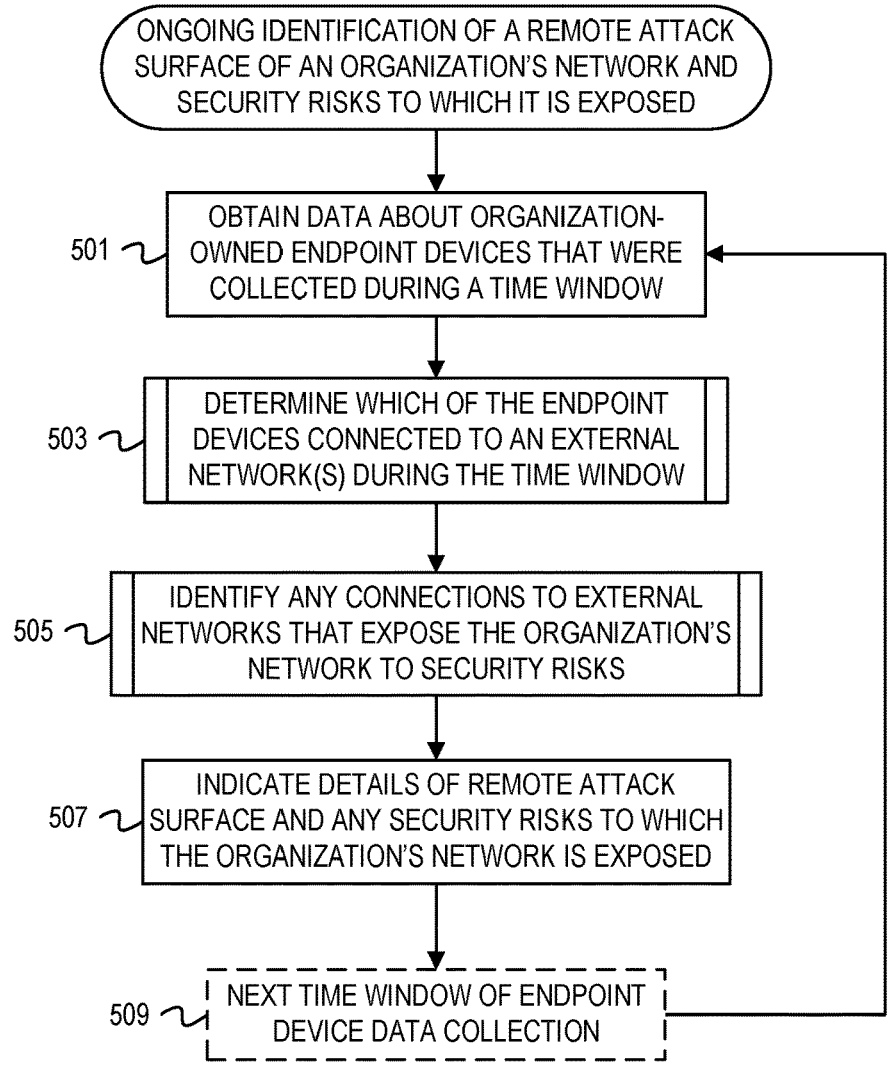
FIG. 5 is a flowchart of example operations for ongoing identification of a remote attack surface of an organization's network and security risks to which it is exposed.

FIGS. 3-5 are example operations for remote attack surface discovery and management. The example operations are described with reference to a RAS manager for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for identifying external networks used by organization-owned endpoint devices. As described above, an external network with respect to an organization is a network that is not affiliated with the organization's network(s), where an organization's network(s) is sometimes referred to as an "internal network." For instance, the external network may be a public network offered in a public setting (e.g., a cafe or library) to which a remote endpoint device connects. As another example, the external network may be the home network of an employee. A remote endpoint device may connect to a VPN offered by the employer after establishing an initial network connection to an external network.

At block 301, the RAS manager obtains data about endpoint devices collected during a time window that at least comprise a public IP address(es). In implementations, endpoint devices owned and distributed by the organization may have agents installed thereon. The agents perform ongoing collection of metadata about the endpoint device when the endpoint device is active. The agents have been configured to determine and record endpoint device metadata upon detecting that the endpoint device is active, where activity may be defined as boot of the endpoint device, establishment of a network connection by the endpoint device, or any other indicator that the endpoint device is being used. Endpoint metadata that an agent collects from an endpoint device at least comprises a public IP address used by the endpoint device and identifying information of the device (e.g., private IP address and/or a device identifier). Other examples of metadata that may be collected by agents include a name and type of the device, an operating system installed on the device, and a username of an employee determined from login after boot of the device. In other examples, the RAS manager obtains data about endpoint devices from endpoint logs and/or VPN logs. Endpoint logs generated by endpoint devices at least indicate a public IP address and identifying information of the device and can be retrieved by the RAS manager from endpoint log storage. The RAS manager can utilize VPN logs generated as endpoint devices connect to the organization's VPN if the VPN provides a logging service that logs public IP addresses associated with connecting endpoint devices. The VPN logs may be obtained from log storage local to the endpoint devices or from log storage maintained by the VPN provider. Like endpoint metadata collected by agents, endpoint and/or VPN logs that are obtained comprise a public IP address used by an endpoint device and are indicative of endpoint devices that were active during the time window. For instance, if an endpoint device did not boot or was in a sleep state during a time window, the RAS manager may not retrieve endpoint logs from the device.

Acquisition of data about endpoint devices by the RAS manager can be triggered upon completion of a time window. The RAS manager may be configured to detect completion of the time window so that endpoint data retrieval from a designated source(s) (e.g., agents, endpoint log storage, and/or VPN log storage) can be initiated by the RAS manager. For instance, in implementations where agents collect device metadata, the RAS manager can communicate requests to deployed agents or the agents can communicate endpoint metadata that were collected during the time window to the RAS manager. The RAS manager (or agents, if installed) may determine that a time window has completed upon expiration of a timer corresponding to a time window (e.g., a 24 hour timer) or based on a scheduled event corresponding to the time window.

At block 303, the RAS manager begins analyzing each of the obtained endpoint data. At block 305, the RAS manager determines the public IP address(es) used for a network connection(s) that the endpoint device established. The data obtained for the endpoint device may indicate one public IP address if the endpoint device connected to one network during the time window or multiple public IP addresses if the endpoint device connected to multiple networks during the time window, such as by establishing network connections from different locations having corresponding routers with different public IP addresses. The RAS manager determines the one or more public IP addresses based on a respective field(s) of the data obtained for the endpoint device.

At block 307, the RAS manager determines if the public IP address(es) is associated with the organization. The RAS manager maintains or has access to a repository or data structure(s) that stores a plurality of public IP addresses that are associated with the organization. A public IP address is associated with the organization if it has been registered to the organization and/or is assigned to a network device owned by the organization. The RAS manager determines whether any of the one or more public IP addresses identified from the endpoint metadata is associated with the organization by searching/querying the repository or data structure(s). In some examples, the RAS manager may cache public IP addresses determined not to correspond to the organization to expedite lookups of public IP addresses identified from endpoint data. The RAS manager can first determine whether the public IP address(es) has been cached based on a previous lookup that yielded a determination that the public IP address was not associated with the organization. If the public IP address has not been cached, the RAS manager can perform an additional lookup(s) for the public IP address in the repository or data structure(s). If any of the one or more public IP addresses are not associated with the organization, operations continue at block 309. Otherwise, if the public IP address(es) is associated with the organization, operations continue at block 311.

At block 309, the RAS manager indicates that the endpoint device was connected to an external network during the time window. The RAS manager can indicate that the endpoint device was connected to an external network by flagging the endpoint data, adding the endpoint data to a set of endpoint data that corresponds to endpoint devices connected to external networks, storing the endpoint data in a repository that maintains records for endpoint devices determined to be remote from the organization, and/or otherwise distinguishing the endpoint data from those corresponding to endpoint devices connected to the organization's network.

In some examples, the RAS manager can create and maintain records for each endpoint device that has been determined to use an external network, where each record indicates an endpoint device (e.g., with a device identifier) and one or more public IP addresses that the endpoint device has used that are not associated with the organization. As part of indicating that the endpoint device was connected to the external network, the RAS manager can create a record for the endpoint device that indicates the public IP address(es) used by the endpoint device during the time window or update an existing record maintained for the endpoint device with the public IP address(es) if it has not yet been used by and recorded for the endpoint device. As an example, the RAS manager may maintain or manage a repository of records of remote endpoint devices, where each entry in the repository corresponds to a record that indicates an endpoint device and any external (i.e., non-organization owned or registered) public IP addresses determined to be used by the endpoint device. In implementations where a repository is maintained or managed, as part of indicating that the endpoint device was connected to an external network during the time window, the RAS manager submits a request to the repository to create an entry for the endpoint device or update an existing entry for the endpoint device with the public IP address(es) identified for the time window (e.g., via a Hypertext Transfer Protocol ("HTTP") PUT request or an application programming interface ("API") call for a database update). The request may also indicate the time window during which the public IP address(es) was used so the entry that is created/updated indicates the time window in association with the public IP address(es). For instance, the request may also comprise a timestamp associated with the retrieval of the data about the endpoint devices at block 301.

At block 311, operations continue based on whether there are additional endpoint data. If there are additional endpoint data, operations continue at block 303. If the RAS manager has analyzed each of the obtained endpoint data, operations are complete.

FIG. 4 is a flowchart of example operations for identifying connections to external networks that are a security issue for an organization. The example operations can be performed after the RAS manager has identified public IP addresses used by endpoint devices of the organization for external network connections.

At block 401, the RAS manager begins evaluation of each public IP address associated with an external network and the corresponding endpoint device(s). The RAS manager begins evaluation of each unique public IP address that was identified in at least a first of the data obtained from endpoint devices. The public IP addresses associated with external networks and corresponding endpoint devices connected to the external networks were identified as described in reference to FIG. 3. The RAS manager evaluates each unique public IP address determined to correspond to an external network since multiple endpoint devices may be connected to the same external network (e.g., if multiple remote employees are utilizing public Wi-Fi offered by the same business).

At block 403, the RAS manager retrieves data about the public IP address that was determined from global IP address probing. As described above, the RAS manager or a platform/system with which it cooperates performs periodic probing of public IP addresses to collect information about each probed public IP address, such as services (i.e., software instances that respond to network communications) that are exposed via each public IP address. Other examples of information about a public IP address that can be obtained from probing include geolocation data, a number of hosts known to be using the public IP address, and/or an owner/provider of the public IP address (e.g., ISP or CSP that assigned the public IP address). The RAS manager has access to a repository of data about public IP addresses that were determined from public IP address probing ("probe data"). Any public IP address that is used by a remote endpoint device should have a corresponding entry in the repository since global IP address probing targets the set of publicly routable IP addresses. The RAS manager can determine the data about the public IP address by querying the repository for the public IP address, where a result of the query yields the probe data corresponding to the public IP address. The RAS manager can also retrieve data about the public IP address from sources other than the repository of probe data. For example, the RAS manager can retrieve data about the public IP address from a repository or other auxiliary data store for threat intelligence data, such as those obtained from identification and analysis of threats associated with public IP addresses.

At block 404, the RAS manager adds the public IP address, an indication of the endpoint device(s) using the public IP address, and at least a subset of the data about the public IP address to the results. The results indicate the remote attack surface of the organization's network during the time window in terms of the endpoint devices that connected to external networks. If multiple endpoint devices were identified to use the external network corresponding to the public IP address (i.e., based on data obtained for multiple endpoint devices indicating the public IP address), the RAS manager adds an indication of each endpoint device to the results. The results also indicate the public IP addresses used by the remote endpoint devices and known information about those public IP addresses determined from global public IP address probing.

At block 405, the RAS manager analyzes the data about the public IP address based on criteria for identifying external networks associated with security risks. The RAS manager maintains criteria based on which it evaluates data about public IP addresses associated with external networks to determine whether external networks expose the organization's network to security risks. As an example, an external network to which an endpoint device of the organization is connected may expose the organization's network to a security risk if a vulnerable or outdated service is hosted on the external network and is accessible over the Internet. The criteria may include indications of one or more services that may be identified in probe data, where identifying the indication(s) of the service(s) in probe data obtained for a public IP address yields a determination that the corresponding one(s) of the criteria is satisfied.

At block 407, the RAS manager determines if one or more of the criteria are satisfied. If at least a first criterion is satisfied and the external network corresponding to the public IP address is associated with a security risk, operations continue at block 409. Otherwise, operations continue at block 411.

At block 409, the RAS manager adds an indication of the security issue(s) corresponding to those of the criteria that were satisfied to the results. The identified security issue(s) corresponds to those of the criteria that were satisfied by the probe data. For instance, if the RAS manager determined that the external network is associated with a security issue of having an RDP server hosted thereon, the security issue may be represented as "RDP server publicly exposed on network." The results corresponding to the public IP address therefore identify the endpoint device(s) that connects to an external network via the public IP address and indicates the security issue(s) associated with the connection to the external network.

At block 411, operations continue based on whether the RAS manager identified another public IP address(es). If another public IP address(es) used by an endpoint device(s) remains for analysis, operations continue at block 401. If each public IP address has been analyzed, operations continue at block 413.

At block 413, the RAS manager indicates the results that comprise indications of endpoint devices that form the remote attack surface of the organization's network and any associated security issues. The RAS manager can indicate the results by storing the results in a repository, generating a report or notification comprising the results, generating a GUI depiction of the results, and/or otherwise making the results available for review and analysis. From the results, the organization can identify the remote attack surface of its network and any security issues that arise from connections to external networks that expose the organization's network to security risks.

FIG. 5 is a flowchart of example operations for ongoing identification of a remote attack surface of an organization's network and security risks to which it is exposed. The identification of the remote attack surface and connections to external networks that expose the organization's network to security risks is ongoing in that it is performed periodically without scheduled end. The RAS manager performs the remote attack surface and risk identification periodically because both the external networks to which remote endpoint devices of the organization are connected and the security risks associated therewith can change any time. Ongoing remote attack surface detection and determination of associated security risks is thus reflective of these changes that may occur both among remote endpoint devices and to the external networks.

At block 501, the RAS manager obtains data about organization-owned endpoint devices that were collected during a time window. As described in reference to block 301 of FIG. 3, retrieval of data about endpoint devices is triggered by completion of a time window. The RAS manager can obtain the data from agents installed on the endpoint devices, from endpoint log storage that stores endpoint logs generated by the endpoint devices, and/or from VPN log storage. The obtained data corresponding to each endpoint device at least comprise a public IP address(es) used by the device during the time window and endpoint metadata that uniquely indicate the endpoint device (e.g., a private IP address and/or device identifier).

At block 503, the RAS manager determines which of the endpoint devices connected to an external network(s) during the time window. As described above, endpoint devices that connected to an external network(s) are those that use a public IP address(es) that is not associated with the organization. The RAS manager can identify the public IP addresses that are not associated with the organization and thus correspond to external networks as similarly described in reference to blocks 303-311 of FIG. 3.

At block 505, the RAS manager identifies any connections to external networks that expose the organization's network to security risks. The RAS manager can evaluate connections to external networks based on security policies for external networks or other criteria for identifying connections to external networks that are associated with security risks. While the organization may be unable to enforce its own security policies for external networks directly since these networks are not managed by the organization, the RAS manager can enforce security policies that indicate security risks identified by the organization to facilitate identification of external networks associated with security risks. As a result, correction and any remediation can be initiated on the organization's end if an endpoint device connects to an external network that is associated with a security risk and thereby exposes the organization's network to the security risk. The RAS manager can identify connections to external networks that expose the organization's network to security risks as similarly described by the example operations given in reference to FIG. 4.

At block 507, the RAS manager indicates details of the remote attack surface and any security risks to which the organization's network is exposed. The RAS manager may indicate the details of the remote attack surface and any associated security risks by generating a report or notification, generating a GUI depiction, storing the details of the remote attack surface and any security risks in a repository, or otherwise making the details of the remote attack surface and any security risks available. The details of the remote attack surface comprise indications of the endpoint devices that were determined to be connected to external networks (e.g., by device identifier and/or private IP address) and may also comprise data about the public IP addresses used by the remote endpoint devices to provide the organization with insight into the networks used by its remote employees.

At block 509, operations continue with the next time window of data collection for endpoint devices. The next time window may be the period between scheduled retrieval of data from the agents and/or from the pertinent log storage. As another example, the next time window may begin by resetting a timer by which the time window is measured (e.g., a 24 hour timer). Continuance of the next time window of data collection can occur concurrently with the analysis of data obtained from the agents during the previous time window as described at blocks 503-507.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 303-311 can be performed in parallel or concurrently across endpoint metadata. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
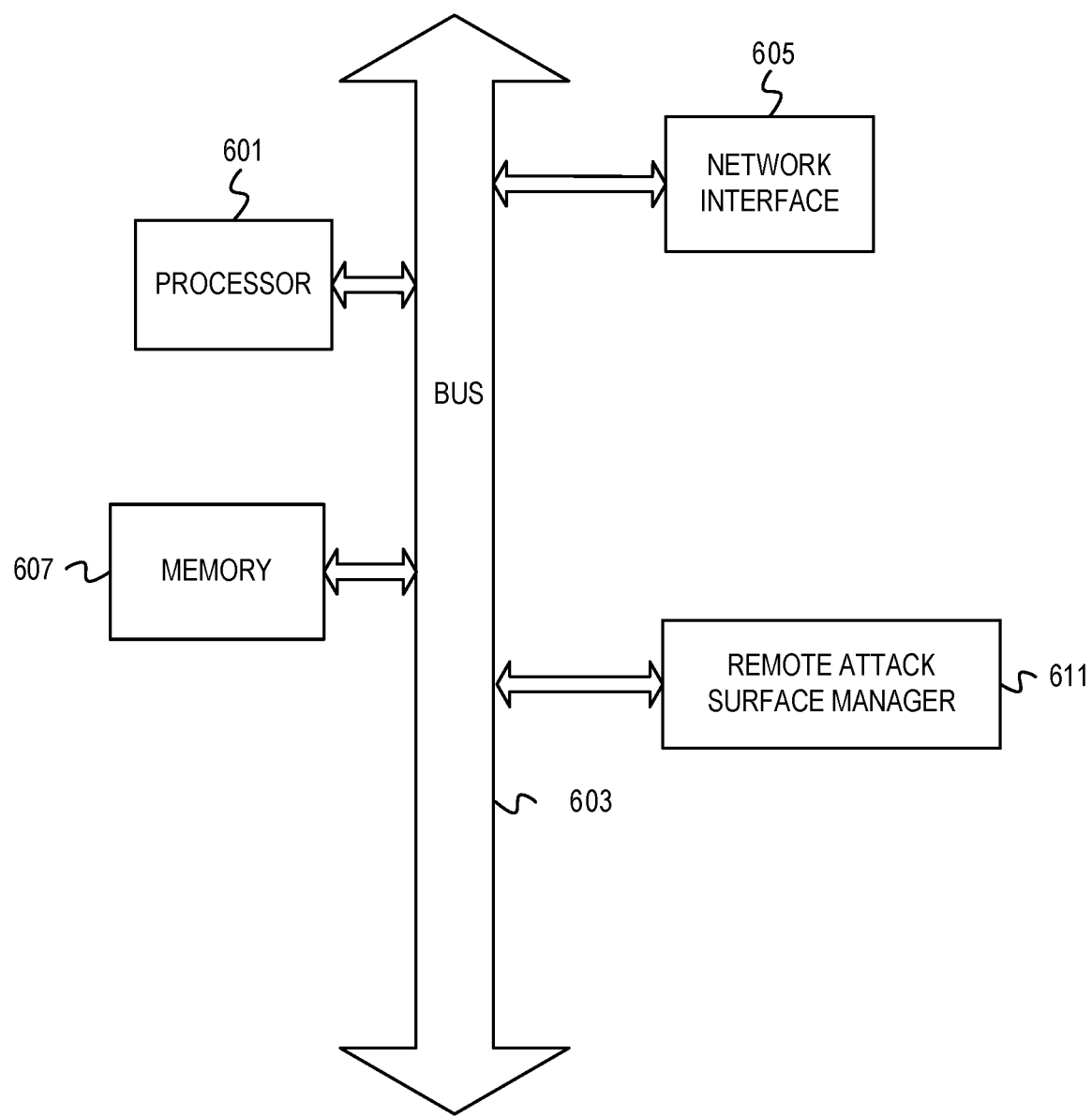
FIG. 6 depicts an example computer system with a remote attack surface manager.

FIG. 6 depicts an example computer system with a remote attack surface manager. The computer system includes a processor 601 (possibly including multiple processors, multiple cores, multiple nodes, and/or implementing multithreading, etc.). The computer system includes memory 607. The memory 607 may be system memory or any one or more of the above already described possible realizations of machine-readable media. The computer system also includes a bus 603 and a network interface 605. The system also includes remote attack surface manager 611. The remote attack surface manager 611 performs ongoing identification of the remote attack surface of an organization's network based on determining endpoint devices issued by the organization that are connected to external networks. The remote attack surface manager 611 also determines whether any of the connections to external networks are a security issue for the organization based on data obtained from public IP address probing. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for discovery and management of a remote attack surface of an organization's network as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
based on analyzing first endpoint data obtained from a plurality of endpoint devices associated with an organization,
determining that a first endpoint device of the plurality of endpoint devices has established a first network connection to a first external network that is not associated with the organization based, at least in part, on determining that a first public Internet Protocol (IP) address corresponding to the first external network is not associated with the organization; and
determining that a second endpoint device of the plurality of endpoint devices has established a second network connection to a second external network that is not associated with the organization, wherein the second external network is different from the first external network;
correlating a first subset of the first endpoint data corresponding to the first endpoint device with first data obtained from probing the first public IP address associated with the first external network;
correlating a second subset of the first endpoint data corresponding to the second endpoint device with second data obtained from probing a second public IP address associated with the second external network;
determining, based on at least one of the first data and the second data, that at least one of the first external network and the second external network is associated with a security risk; and
indicating that at least one of the first network connection established by the first endpoint device and the second network connection established by the second endpoint device is a security issue for the organization.

2. The method of claim 1, wherein the first endpoint data indicate public IP addresses used by corresponding ones of the plurality of endpoint devices for establishing respective network connections, and wherein analyzing the first endpoint data comprises determining the public IP addresses used by the plurality of endpoint devices for establishing the respective network connections.

3. The method of claim 2, wherein determining that the first public Internet Protocol (IP) address corresponding to the first external network is not associated with the organization comprises determining that the public IP address used by the first endpoint device for establishing the first network connection is not owned by or registered to the organization.

4. The method of claim 1 further comprising analyzing the first data based on one or more criteria for identifying security risks associated with external networks, wherein determining that the first external network is associated with the security risk comprises determining that the first data satisfy a first of the one or more criteria.

5. The method of claim 1, wherein the first data indicate at least one of geolocation data associated with the first public IP address, a number of devices associated with the first public IP address, a provider of the first public IP address, and one or more services that are exposed via the first public IP address.

6. The method of claim 1, wherein the second endpoint device is different from any of the plurality of endpoint devices.

7. The method of claim 1, wherein the first endpoint device and the second endpoint device are the same.

8. The method of claim 1 further comprising obtaining the first endpoint data from the plurality of endpoint devices.

9. The method of claim 8, wherein the first endpoint data were collected during a time window, and wherein the first endpoint data indicate endpoint devices associated with the organization that were active during the time window.

10. The method of claim 8, wherein the first endpoint data comprise at least one of data collected by agents installed on respective ones of the plurality of endpoint devices, endpoint logs generated by the plurality of endpoint devices, and virtual private network logs.

11. One or more non-transitory machine-readable media having program code stored thereon, the program code comprising instructions to:
identify first and second endpoint devices associated with an organization that are connected to respective first and second networks external to the organization based on obtained data for the first and second endpoint devices based, at least in part, on a determination that a respective first and second public network addresses corresponding to the first and second networks are not associated with the organization, wherein the first and second networks are different;
examine first data about the first network to determine whether the first network complies with a security policy of the organization;
examine second data about the second network to determine whether the second network complies with the security policy of the organization, wherein the first data and the second data were obtained based on ongoing probing of public network addresses;
based on a determination that the first network does not comply with the security policy, indicate the first endpoint device and noncompliance with the security policy of the first network to which the first endpoint device is connected; and
based on a determination that the second network does not comply with the security policy, indicate the second endpoint device and noncompliance with the security policy of the second network to which the second endpoint device is connected.

12. The non-transitory machine-readable media of claim 11, wherein the instructions to identify the first and second endpoint devices comprise instructions to determine the first and second public network addresses associated with the first and second endpoint devices based on data obtained from the first and second endpoint devices and determine that neither of the first and second public network addresses is not are one of a plurality of public network addresses owned by or registered to the organization.

13. The non-transitory machine-readable media of claim 12, wherein the program code further comprises instructions to determine the first data about the first network based on the first public network address and to determine the second data about the second network based on the second public network address.

14. The non-transitory machine-readable media of claim 11, wherein the security policy comprises a first rule for data obtained for networks external to the organization, wherein the instructions to determine whether the first network complies with the security policy comprise instructions to determine whether the first data satisfy the first rule.

15. An apparatus comprising:
a processor; and
a non-transitory computer-readable medium having instructions stored thereon that are executable by the processor to cause the apparatus to,
based on analysis of first endpoint data obtained from a plurality of endpoint devices associated with an organization,
identify a first endpoint device of the plurality of endpoint devices that has established a first network connection to a first network that is external to a network of the organization based, at least in part, on a determination that a first public Internet Protocol (IP) address corresponding to the first network is not associated with the organization; and
identify a second endpoint device of the plurality of endpoint devices that has established a second network connection to a second network that is not associated with the organization, wherein the second network is different from the first network;
correlate a first subset of the first endpoint data corresponding to the first endpoint device with first data obtained from probing the first public IP address associated with the first network;
correlate a second subset of the first endpoint data corresponding to the second endpoint device with second data obtained from probing a second public IP address associated with the second network;
determine, based on the first and second data, if at least one of the first and second networks is associated with a security risk; and
based on a determination that at least one of the first and second networks is associated with a security risk, indicate that at least one of the first and second network connections established by the at least one of the first and second endpoint devices exposes the network of the organization to the security risk.

16. The apparatus of claim 15, wherein the instructions executable by the processor to cause the apparatus to analyze the first endpoint data comprise instructions executable by the processor to cause the apparatus to determine public IP addresses used by the plurality of endpoint devices for establishing respective network connections.

17. The apparatus of claim 16, wherein the instructions executable by the processor to cause the apparatus to identify the first endpoint device comprise instructions executable by the processor to cause the apparatus to identify the first endpoint device based on a determination that the first public IP address used by the first endpoint device for establishing the first network connection is not owned by or registered to the organization.

18. The apparatus of claim 15 further comprising instructions executable by the processor to cause the apparatus to analyze the first data based on one or more criteria for identifying security risks associated with external networks, wherein the instructions executable by the processor to cause the apparatus to determine if the first network is associated with the security risk comprise instructions executable by the processor to cause the apparatus to determine if the first data satisfy any of the one or more criteria.

19. The apparatus of claim 15, further comprising instructions executable by the processor to cause the apparatus to obtain the first endpoint data from the plurality of endpoint devices, wherein the first endpoint data were collected during a time window, and wherein the first endpoint data indicate endpoint devices associated with the organization that were active during the time window.

20. The apparatus of claim 19, wherein the first endpoint data comprise at least one of data collected by agents installed on respective ones of the plurality of endpoint devices, endpoint logs generated by the plurality of endpoint devices, and virtual private network logs.

* * * * *